United States Patent [19]

Dixon et al.

[11] 4,009,304

[45] Feb. 22, 1977

[54] FLUORINATED POLYESTER TIRE REINFORCEMENT MATERIALS

[75] Inventors: Dale D. Dixon, Kutztown; William Mayo Smith, Jr., Allentown, both of Pa.

[73] Assignee: Air Products and Chemicals, Inc., Allentown, Pa.

[22] Filed: Dec. 12, 1974

[21] Appl. No.: 531,854

Related U.S. Application Data

[63] Continuation-in-part of Ser. No. 185,412, Sept. 30, 1971, abandoned, and a continuation-in-part of Ser. No. 285,831, Sept. 1, 1972, abandoned.

[52] U.S. Cl. .............................. 427/322; 260/75 H; 260/75 T; 428/265; 428/395; 428/480; 428/524
[51] Int. Cl.² .......................................... B05D 3/00
[58] Field of Search ........... 427/322, 444; 428/265, 428/395, 480, 524; 260/75 H, 75 T

[56] References Cited

UNITED STATES PATENTS

| | | | |
|---|---|---|---|
| 2,129,289 | 9/1938 | Soll | 427/235 |
| 2,811,468 | 10/1957 | Joffre | 427/235 |
| 2,829,070 | 4/1958 | Osborn | 428/480 |
| 3,255,099 | 6/1966 | Wolinski | 264/22 |
| 3,325,333 | 6/1967 | Kigane et al. | 428/524 |
| 3,364,056 | 1/1968 | Seibel | 427/223 |
| 3,431,241 | 3/1969 | Moult et al. | 428/395 |
| 3,437,610 | 4/1969 | Moult | 428/524 |
| 3,644,136 | 2/1972 | McCullough | 427/322 |
| 3,658,637 | 4/1972 | Danielson | 428/480 |
| 3,740,256 | 6/1973 | Manion et al. | 427/235 |

*Primary Examiner*—Ronald H. Smith
*Assistant Examiner*—Sadie L. Childs
*Attorney, Agent, or Firm*—Richard A. Dannells; Barry Moyerman

[57] ABSTRACT

Adhesion of polyester yarn, tire cord or fabric in polyester reinforced rubber goods such as tires is improved by fluorinating the polyester yarn, tire cord or fabric prior to incorporation into the tire and rubber goods.

5 Claims, No Drawings

FLUORINATED POLYESTER TIRE REINFORCEMENT MATERIALS

This application is a continuation-in-part of application Ser. No. 185,412, filed Sept. 30, 1971 (now abandoned) and of Ser. No. 285,831, filed Sept. 1, 1972 (now abandoned).

This invention relates to fabrication of fabric-rubber laminates, and in particular to a method for improving the adhesion of polyester yarn, tire cord or fabric in polyester reinforced tires.

Vast quantities of polyester fiber based fabrics (e.g. tire cord) are employed for tire reinforcement purposes despite considerable difficulty in securing adequate adhesion between polyester and the other materials in the tire. The methods and aids successfully employed to bond cellulosic and nylon yarns, tire cords or fabrics into tires required modification to fit the different chemistry of polyesters, including for example, an added dip treatment wherein the polyester is contacted with an isocyanate formulation, which dip is followed by the conventional dip with a resorcinol-formaldehyde-latex and then the usual processing to form the reinforced tire.

Although polyester tire cord reinforcements are employed in large scale, bonding problems remain. Far too often bond failure occurs at the interface between the polyester reinforcement and the adhesion promoter.

BACKGROUND OF THE INVENTION

Fluorination of fiber form polyesters has been discovered to impart desirable properties to the final fabric, certainly from the viewpoint of wearing apparel. The soil resistance and moisture transport properties are greatly improved. Reference is made to copending application Ser. No. 434,285, filed Jan. 17, 1974 for detailed explanation of the fluorination procedure, and the resulting properties of the polyester.

Of significance, both apparel purposes and for tire reinforcement purposes, is that fluorination creates carboxylate groups on the surface of the polyester material. (The carboxylate groups are believed to be the reason for considerable improvement in moisture transport.) Within the context of employing polyester yarns, tire cord and fabric for tire reinforcement purposes, the carboxylate groups are polar reactive groups important for good adhesion in a laminate. Indeed one explanation offered for the relatively poor adhesion of polyester tire cord has been the absence of potentially reactive groups in the polyester macromolecule. In theory at least, the isocyanate dip involves chemical reactions which add reactive groups to the polyester surface.

Presence of carboxylate groups in the rubber formulation has been contemplated, e.g. by inclusion of acrylate moieties within the rubber formulation polymers. The test results indicated that adhesion of rubber to fibrous reinforcement that was in fact improved. However, carboxylate containing rubber formulations have not been adopted by the industry.

THE INVENTION

Briefly stated, the present invention involves fluorinating a polyester reinforcement material, which may be filament or yarn or tire cord or tire fabric and incorporating the fluorinated polyester material within the rubber goods as the reinforcement therein according to conventional practices.

Thus, after fluorination, the polyester reinforcement material is top coated with an adhesion promoter, such as for example a resorcinol-formaldehyde-latex (RFL) and then laminated or otherwise bonded into the rubbery composition from which the rubber article is formed. The fluorination treatment substantially improves adhesion between the polyester and the RFL interface.

Although this invention is described almost entirely with reference to tire reinforcement, other rubber goods including for example transmission belts require reinforcement. In such rubber goods generally the life of the goods may depend upon the strength of the adhesive bond between the reinforcement and the rubber being reinforced thereby. Practice of this invention is applicable to all polyester reinforced rubber goods.

The fluorination treatment is affected in an atmosphere of low oxygen content, preferably one substantially free of oxygen, for relatively brief periods of exposure. A mild fluorination treatment is intended. In no event is the polyester reinforcement material fluorinated to a combined fluorine content in excess of 5% and preferably far less than 1% by weight of the fiber.

As a result of the fluorination treatment the polyester will be fluorinated in the surface layers only. The fluorination level can be expressed as being from $4 \times 10^{-7}$ to $4 \times 10^{-1}$ mg F/cm$^2$. Inasmuch as intrusive fluorination causes a substantial decrease in tensile strength of the basic fiber, one direct measure of the extent to which fluorination has taken place is loss of tensile strength relative to like untreated polyester fiber, cord or fabric. The polyester materials treated according to practice of the present invention retain in excess of 90% of their tensile strength, preferably in excess of 95%.

In accordance, then, with the present invention, the polyester materials are directly fluorinated in an atmosphere considered substantially free of oxygen. That is to say a mixture of carrier gas and fluorine gas, virtually free of any oxygen, is preferred, i.e., less than about 0.1% by volume. Substantially oxygen free, as used herein, is intended to denote both the fluorination gas mixture charge into whatever reactor is employed and the fluorination locus of the reactor when charged with said gas mixture. However, commerically available fluorine, as well as inert carrier gases, like nitrogen, may contain minor quantities of oxygen and the essentially unavoidable oxygen present in such gases, and that remaining in the reactor must be accepted within falling with the sense of a substantially free-of-oxygen fluorination.

As a practical matter, the fluorination may be successfully practiced with relatively small amounts of oxygen being present, up to about 5% by volume in the fluorination locus. Nevertheless, most optimally, it is preferred that the level of oxygen present be minimized to less than 0.1% by volume.

Thus, in carrying out the objectives of the present invention a fluorinating mixture substantially free of oxygen, comprising generally from about 0.01% to about 5% elemental fluorine and correspondingly from about 99.99% to about 95% of carrier gas may be used. The quantity of fluorine in the gaseous mixture feed to the fluorination will range from 0.01% to about 5%, the balance being carrier. A more preferable and economical range is from about .01% to about 2% fluorine. The fluorine content at the fluorination locus is always lower, sometimes as low as 0.001%.

During fluorination, a fluorinated carboxylated layer is formed on the polyester surface. Formation of such a layer has been confirmed by means of an electron microscope, by infra-red spectoscopy and by direct titration tests made after the fluorinated polyester has been subjected to a standard wash cycle.

The combined fluorine groups and the carboxylate groups are concentrated at the fiber surface, i.e. within about 10° A of the fiber surface. What is not known for certain is the reaction mechanisms and the chemistry involved in the formation of carboxylate groups as incident to fluorination. For explanation of the fluorination reaction posed without intent to bind the demonstrable advantageous results achieved by practice of this invention to as yet unproven theory, reference is made to Ser. No. 434,284, now abandoned and Ser. No. 434,285, filed Jan. 17, 1974.

The fluorination reaction involves fluorination of surface alkyl groups, aromatic rings, some subsurface fluorination, and chain scission. A self correcting situation seems to exist. The diffusion barrier against subsurface penetration by the fluorine and the apparently less favored nature of ring fluorination relative to fluorination of alkyl groups direct the fluorine towards fresh fiber surface areas as yet unfluorinated. In consequence fiber, cord or fabric in bulk form may be fluorinated suprisingly uniformly. Indeed, the polyester material may be wound on a spool, and fluorinated. In such an instance, fluorination will occur initially on the immediately exposed surfaces, but subsequently the less exposed fiber surfaces such as exist in the interstices of the fabric and deep in the spool will fluorinate preferentially to intrusive fluorination of the most exposed surfaces.

Tests indicate that the fluorination creates surface carboxylate groups. In this respect, fluorination is quite different from chlorination, even chlorination conducted in the presence of activation (e.g. by ultra-violet light), since chlorination does not create surface carboxylate groups to any significant degree. In terms of the present invention, the presence of carboxylate groups are believed to be a cause of improved adhesion.

The combined fluorine groups on the polyester surface do not, apparently, have any detrimental effect, despite the inert non-stick characteristics often ascribed to fluorocarbon surfaces. Without being bound thereto, it is believed that such absence of adverse surface properties is attributable to burn-off (by fluorine) of a low molecular weight surface layer normally present on the polyester surface. The surface so hampers adhesion, the disappearance thereof substantially improves adhesive bonding. Besides, some migration or diffusion of surface molecules (of the polyester) may well occur during tire molding so that the very thin fluorinated surface layer largely disappears from the actual interface.

To avoid a possible decrease in the tensile strength of the polyester materials incident to fluorination, the degree of fluorination should be maintained at the low levels as taught herein.

Tensile strength measurement is therefore a measurement of the fluorination reaction, quantitatively as well as qualitatively. Accordingly, practice of this invention involves fluorination to the least reasonable extent, employing the most dilute fluorine (in a carrier gas) consistent with the level of reaction desired with never more than 20% preferably less than 5% fluorine content in the gas. A low fluorine content in the gas helps cool the reaction and facilitates the preferential reactions desired for achieving uniform fluorination of fiber surfaces.

One realistic measurement for the fluorination reaction is, of course, the number of fluoride groups present on the fiber surface, with the meaningful value for fluorine content being the wt. (mg) of fluorine per $cm^2$ of fiber surface, preferably measured after washing the fluorinated fiber yarn, tire cord, or fabric.

Measurement convenience will often dictate testing some weight of fiber of fabric then computing the carboxylate and fluoro groups present on the surface from fiber diameter, and density.

The fluoride content range for polyester is about $4 \times 10^{-7}$ to $4 \times 10^{-1}$ mg $F/cm^2$, with preferred ranges of about $4 \times 10^{-6}$ to $1 \times 10^{-3}$ mg $F/cm^2$. However, it should be appreciated that actual practice of the invention always involves a particular treatment level, e.g. $1 \times 10^{-5}$ for a specific material. The preferred treatment level will be different for each class of polyester substrates, and usually takes into account fiber size, cord twist, fabric weave count, etc. Treatment conditions are of course selected for the minimum treatment level consistent with the circumstances at hand. For example, if polyester filaments are being treated, a fluorination treatment to achieve $1 \times 10^{-5}$ mg $F/cm^2$ will be preferred. On the other hand, treatment of a polyester tire cord wound on a spool may well require fluorination treatment to $1 \times 10^{-3}$ mg $F/cm^2$ in order to be certain that the cord had been surface fluorinated throughout. (All the above fluoride content values provided are unwashed values.)

An additional measurement for fluorination reaction is believed to be the number of carboxylate groups present on the fiber surface, a direct indication being the neutralization equivalent of treated samples (as compared to untreated samples).

DESCRIPTION OF THE PREFERRED EMBODIMENTS

In accordance with preferred practice of the present invention, fluorinated carboxylated polyesters suitable for tire reinforcement are obtained by short cycle, direct fluorination in an atmosphere substantially free of oxygen, as described above. By short cycle is intended gas-solid reaction contact time of less than 15 minutes, preferably less than 5 minutes between fiber and fluorine.

Brief reaction contact times, i.e. less than 15 minutes, preferably less than 5 minutes, is desirable and less than 2 minutes preferred. Polyesters fluorinate readily and can be fluorinated satisfactorily in less than 1 minute.

In any event, all commercial forms of polyesters intended for tire reinforcement purposes can be fluorinated-carboxylated in accordance with practice of the present invention.

The fluorination-carboxylation can be carried out on a continuous basis, for example, by passing the polyester, as tire cord, yarn, or fabric, through the fluorine carrier gas mixture in a suitably sealed chamber through which the fiber form material passes. Alternatively, the material can be unrolled and rerolled inside the treatment chamber.

Instead of a continuous treatment such as described above, the treatment may be a batch operation in which the polyester is exposed to the fluorine carrier gas mixture in a reactor: the material being permitted to remain in contact with the gas mixture for a brief time interval.

Within the limits of the material (e.g....melting point, etc.), the temperature and pressure at which the polyester is treated is not critical. However, the preferred temperature is room temperature, but higher temperatures, such as those ranging up to about 150° C or higher can be employed. Pressure inside the reaction vessel will ordinarily correspond to standard environmental pressures, although elevated pressures can be used without adverse effect.

As previously mentioned, direct fluorination of polyester in an atmosphere substantially free of oxygen requires only a brief reaction time for a fluorinated carboxylated surface layer to form on the material. It has been found, according to the present invention, that exposure time for most types of polyester yarn, tire cord or fabric requires less than 5 minutes. Frequently less than one minute contact time is all that is need in order to form a fluorinated carboxylated surface layer.

However, preferred results to exposure period may vary with the concentration of fluorine in the gas mixture, with exposure shortened when the concentration of fluorine is high.

The significant process aspects for practice of this invention may be recapitulated as follows:

1. A reaction contact time between polyester and fluorination reaction gases of less than about 15 minutes, less than 5 minutes being more desirable, and less than 2 minutes preferred.
2. A reaction gas composition having, by volume:
   a. up to 20% elemental fluorine, less than 5% preferred; specifically preferred is .01-2% for treatment of polyesters;
   b. limiting elemental oxygen content to below 5%, desirably to less than 1%, preferably less than 0.1%. To the extent possible reaction gas substantially free of elemental oxygen is preferred.

When following the conditions noted above for fluorination according to practice of the present invention, it has been found the polyester will not char; there is little loss of other desirable characteristics of the material such as strength; low levels of fluorine are taken up the fiber rather uniformly.

At low fluorination levels, the degree of carboxylation well depend upon both reaction time and % $F_2$ in the reaction medium. At a given reaction time, carboxylation increases as % F incorporation increases. Selecting specific fluorination process conditions for a particular yarn, tire cord or fabric may require a cut and try approach within the already described reaction time and fluorine concentration ranges.

Allusion has been made to the adhesion problem which hampered use of polyester fiber for tire reinforcement. The poor bonding qualities of polyester has been ascribed to reduced ability to form hydrogen bonds, lack of reactive hydrogen and the hydrophobic nature of polyester. Various adhesive formulations have been suggested to attain improved bonding. Fluorination of the polyester improves bonding enough to permit avoidance of treatment with special adhesion enhancement materials, e.g. isocyanates, and such is a preferred practice of this invention.

However, tests to date indicate that a cumulative improvement in bond strength may be obtained through fluorination and treatment with one of the special adhesives. Accordingly, practice of this invention comtemplates interposition of a fluorination step in the otherwise known to the art procedures employed to form polyester reinforced tires, namely just before top coating with adhesion promoter. The actual adhesion promoter employed, when employed, forms no part of this invention, and therefore elaboration thereon need not be provided. However, the widely used resorcinol-formaldehyde-latex promoters are preferred promoters.

Typically, the tire reinforcement, e.g. nylon or polyester, is treated with a resorcinol-formaldehyde-latex composition (RFL) of which many formulations have been suggested to the art. Practice of this invention contemplates no changes in the RFL treatment of the (fluorinated) polyester reinforcement nor in the overall tire fabrication procedure. To repeat, the actual RFL formulation forms no part of this invention.

Accordingly, the preferred practice of the process of this invention involves fluorinating the polyester tire cord or fabric, then without washing applying an RFL composition (one otherwise known to the art) to the cord or fabric according to any of the usual procedures, thereafter by conventional post RFL treatment practices fabricating the polyester reinforced tire. Although not preferred practice of this invention, the fluorination may be conducted on the filament or on the yarn before formation of the tire cord or fabric therefrom.

The following Examples illustrate embodiments of this invention. It is to be understood, however, that the examples are for illustrative purposes only and do not purport to be wholly definitive as to condition and scope for preferred practice of the invention.

EXAMPLE

In each of the tests approximately 50 yards of polyester tire cord (Celanese T-800-1000/2 lot of 38019) was wound in a single layer around a perforated copper cylinder. The sample was inserted into a 2 liter monel reactor, which then was twice evacuated and purged with nitrogen, following which the reactor was evacuated and then exposed to fluorine containing reaction gas (e.g. zero p.s.i.g. of a pre-prepared mix of 0.5 fluorine, 99.5% nitrogen). Fill times were nearly instantaneous. After the exposure time had elapsed, the reactor was evacuated and purged with nitrogen.

The treated samples were tested directly for adhesion and tensile strength. Tire cord adhesion was tested according to ASTM D-2138-62T.

The test results are tabulated below, wherein the values provided are the average of multiple tests:

| Sample | %$F_2$ | Pressure | Reaction Time (sec.) | 1.Treated 2.RFL Treated | | Cord Tensile (lbs.) | Adhesion (lbs.) |
|---|---|---|---|---|---|---|---|
| | | | | Treated | | | |
| Control A | — | — | | | | 34.8 | 3.8 |
| 1-1 | 0.05 | 15 in. Hg | 5 | x | | 33.5 | 4.4 |
| 1-2 | 0.05 | 1 atm. | 5 | x | | 34.0 | 4.2 |

-continued

| Sample | %F$_2$ | Pressure | Reaction Time (sec.) | Treated | 1.Treated 2.RFL Treated | Cord Tensile (lbs.) | Adhesion (lbs.) |
|---|---|---|---|---|---|---|---|
| 1-3 | 0.05 | 1 atm. | 30 | x | | 34.8 | 4.9 |
| 1-4 | 0.05 | 1 atm. | 60 | x | | 34.4 | 5.2 |
| 1-5 | 0.5 | 1 atm. | 5 | x | | 34.0 | 3.9 |
| 1-6 | 0.5 | 1 atm. | 30 | x | | 33.3 | 3.6 |
| 1-7 | 1.0 | 1 atm. | 5 | x | | 34.2 | 3.4 |
| Control B | — | — | | | | 31.2 | 3.8 |
| 15-7 | 0.05 | 15 in.Hg | 3.5 | | x | 31.0 | 16.0 |
| 15-4 | 0.05 | 1 atm. | 7.0 | | x | 31.5 | 20.5 |
| 15-5 | 0.05 | 1 atm. | 30 | | x | 30.5 | 17.5 |
| 15-6 | 0.05 | 1 atm. | 60 | | x | 32.0 | 15.0 |
| 15-1 | 0.5 | 1 atm. | 5 | | x | 31.0 | 20.0 |
| 15-2 | 0.5 | 1 atm. | 30 | | x | 31.0 | 21.0 |
| 15-3 | 1.0 | 1 atm. | 5 | | x | 30.0 | 20.5 |
| *Control C | — | — | | | | 33.5 | 10.5 |
| Control D | — | — | | | | 33.0 | 4.0 |

*Control C treated with RFL only.

The fluorination treatment approximately doubles the adhesion values when using only RFL treatment.

The Resorcinol-Formaldehyde-Latex Formulation (RFL) was as follows:

| Resorcinol-Formaldehyde-Latex Formulation (RFL) | |
|---|---|
| Ingredients | Grams |
| 1. 41% Gen-Tac Latex | 310 |
| 2. Distilled Water and Ammonium Hydroxide Mixture (PH 10) | 590 |
| 3. Resorcinol | 25 |
| 4. 37% Formaldehyde | 14 |
| 5. Distilled Water | 60 |

PROCEDURE:

A. Dissolve No. 3 in No. 4 and No. 5 mixture.
B. Add No. 2 to No. 1 slowly with stirring.
C. Add No. 3, No. 4, and No. 5 mixture to No. 1 and No. 2 mixture slowly with stirring.

% Solids of final RFL dip mixture = 14.7%.

CORD DIPPING PROCEDURE

1. The cord passed through RFL Dip in five seconds.
2. The RFL Coated Cord was dried 90 seconds at 120° F.
3. The RFL Coated Cord was cured 90 seconds at 390° F.

The 1976–15 series picked up more RFL Dip than the untreated polyester cord. This was evidenced by the darker color of the 1976–15 series of cords and also by the cord weight data that follows.

CORD WEIGHT:

Weight in grams of a 12″ length of cord.
Gray   0.0784   1976-15-1 without RFL   0.0791
RFL    0.0806   1976-15-1 with RFL      0.1061

The Rubber Compound formulation was:

-continued

CORD WEIGHT:

| Natural Rubber | 70.00 |
|---|---|
| SBR 1708 | 41.25 |
| N-550 Black | 55.00 |
| Zinc Oxide | 5.00 |
| Napthenic Oil | 10.00 |
| Stearic Acid | 1.00 |
| Wingstay 1 | 1.00 |
| Crystex | 2.10 |
| MBTS (benzothiazyl monosulfide) | 1.00 |
| TMIM (tetramethyl thiuram monosulfide | 0.20 |
| | 186.55 |

All rubber to cord cures were 15 minutes at 300° F.

What is claimed:

1. In the process of forming polyester reinforced rubber goods, the improvement which comprises subjecting the polyester reinforcement material to a fluorine containing gas having less than about 5% by volume of elemental oxygen, and from 0.01-2.0% by volume of elemental fluorine for a treatment time of less than 2 minutes and recovering a material having a surface fluorinated from about $4 \times 10^{-6}$ to $1 \times 10^{-3}$ mg. F/cm.$^2$ and having at least 90% of the tensile strength of untreated material.

2. The process of claim 1 wherein the polyester reinforcement material is cord or fabric.

3. The process of claim 1 wherein tires are being formed and the polyester reinforcement is tire cord or fabric.

4. The process of claim 1 wherein the fluorination is followed by top coating the polyester reinforcement with an adhesion promoter.

5. The process of claim 4 wherein the adhesion promoter is a resorcinol-formaldehyde latex.

* * * * *